July 2, 1929.  W. S. SMITH  1,719,734
SCALE
Filed Jan. 6, 1927
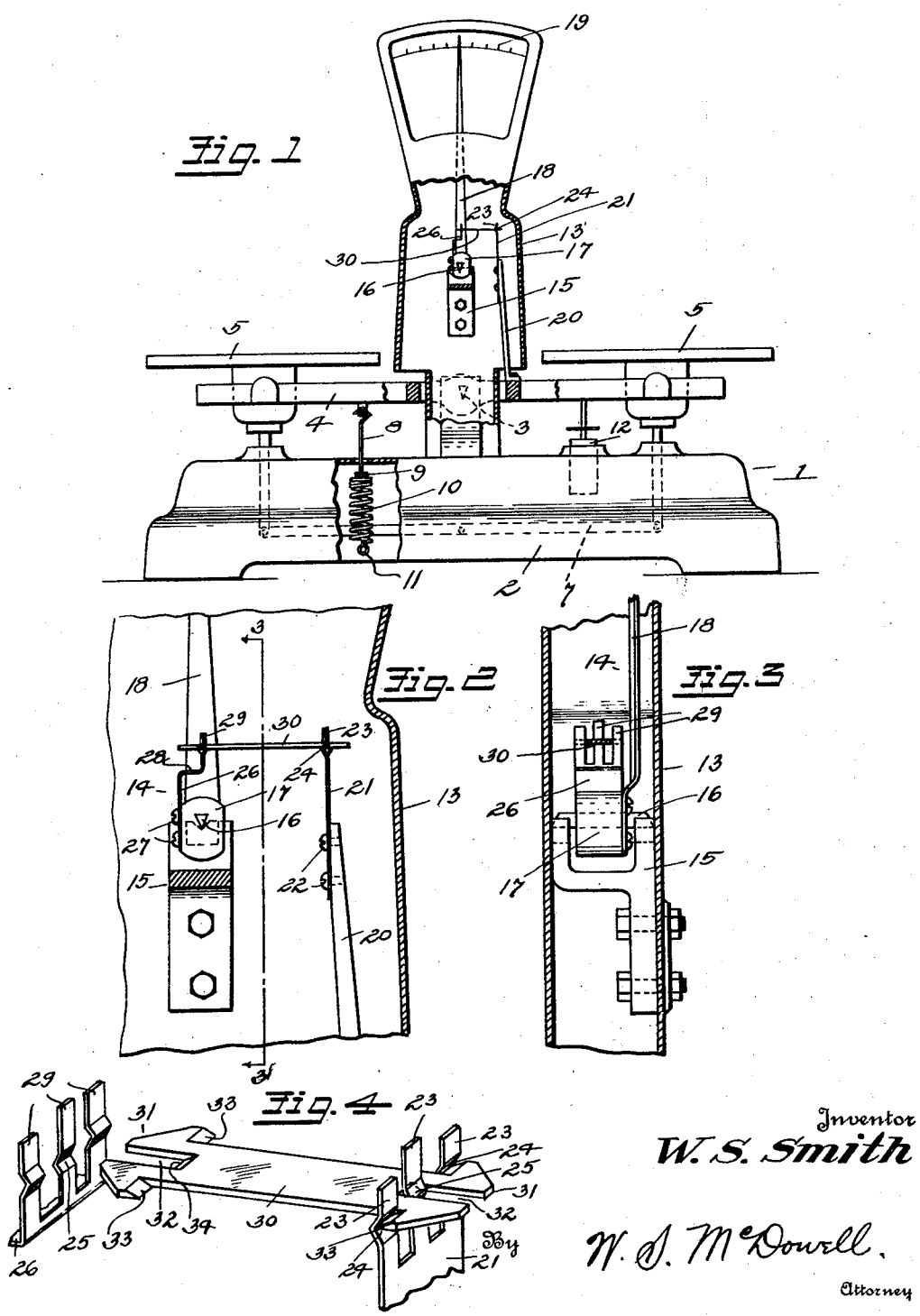

Patented July 2, 1929.

1,719,734

UNITED STATES PATENT OFFICE.

WALTER S. SMITH, OF COLUMBUS, OHIO.

SCALE.

Application filed January 6, 1927. Serial No. 159,415.

This invention relates to improvements in scales, and more particularly to scales of the type employing an even balanced beam and an associated indicating means whereby in the operation of the scale under and over weights with respect to a desired or predetermined weight may be read with accuracy and convenience. The primary object of the invention resides in the provision of an improved motion transmitting means between the movable beam of the scale and the movable weight indicating mechanism, by which a structure is provided of sensitive, friction minimizing form but at the same time exceptionally strong and durable and not apt to break or get out of order.

In even balanced scales of the type set forth it has been customary in the past to connect the evenly balanced beam at points spaced equidistantly from the axis of turning movement thereof with the drum or hub of the movably mounted indicator arm by a flexible metallic strip. This construction, while eliminating friction and error to a marked extent, has not been altogether satisfactory in the commercial operation of such scales, for the reason that the straps are formed from very thin strips of metal which, in the operation of the scale, tend to crystallize and fracture, requiring frequent replacements and loss of use of the scales.

In accordance with the present invention the improved connection between the beam and the indicating mechanism provides a materially more durable construction having a much longer life and freedom from repairs and mechanical difficulties, and consists in providing the beam with a resilient crank extension and in providing the hub portion of the indicating arm with a similar and complemental extension, the said crank extension being connected by means of a self sustaining connecting strip, which is maintained under some degree of tensile stress by the resiliency of the crank extensions, and is so mounted in connection with the latter as to impart push and pull movements to the indicator arm in accordance with the oscillation of the associated beam, there being frictionally supported movable connections between the ends of the connecting strip and said crank extensions so as to compensate for variations in the respective operating positions of the indicating and beam means.

With these and other objects in view, as will appear as the description proceeds, the invention consists in the novel features of construction, combinations of elements and arrangements of parts hereinafter to be fully described and pointed out in the appended claims.

In the accompanying drawings:

Figure 1 is a view in side elevation of a scale constructed in accordance with the features of the present invention, parts of the scale being broken away and shown in section to set forth more clearly interior mechanism, Figure 2 is an enlarged vertical sectional view of the connection, comprising the present invention, between the beam and indicating means of the scale, Figure 3 is a vertical transverse sectional view on the line 3—3 of Figure 2, Figure 4 is a detail perspective view showing the beam and indicator connecting means preferably employed in carrying out the present invention.

Referring more particularly to the drawing the numeral 1 designates a scale formed in accordance with the present invention. Generally, the scale includes a customary form of base 2, provided centrally with upstanding supports for the reception of the knife edge trunnions 3 projecting horizontally and rigidly from the central portion of an evenly balanced beam 4, the trunnions 3 serving as a major axis of turning movement on the part of the beam. The outer ends of the beam, at equally spaced parts from the axis 3, are provided with the usual weight receiver 5, the depending stems 6 of which having their lower ends connected with a check rod 7, pivoted as usual within the confines of the base 2, these connections providing the usual parallelogram common in scales of this type.

In order to balance the beam and to provide forces tending to maintain the same in a given neutral position, when unweighted, one side of the beam is connected with a depending rod 8, threaded at its lower end for the reception of an adjustable nut 9 with which is connected the upper end of a tension spring 10, the lower end of the latter being connected as at 11 to a stationary point in the lower part of the base 2. The opposite end of the beam, as regards the end with which the spring is connected, is of weighted or heavier construction than the opposing or complemental end, whereby through the adjustment of the spring 10 the entire beam structure may be brought into a position of balance, commonly termed the neutral position. I, of course, do not limit myself to this method of balancing the beam, or in providing means for maintaining the same normally in a neutral position, but may resort to other constructions now generally known for accomplishing this purpose. The heavier ends of the beam may, if desired, be connected with a dash pot 12, so as to stabilize the oscillation of the beam following the application of weight thereto.

Arising from the base 2 is a tower 13, rigidly connected with the base, and which is adapted to contain the weight indicating mechanism, designated generally by the numeral 14. In the simple form of the invention disclosed, the interior of the tower is provided with a support or bracket 15, provided with seats, for the reception of the knife edge trunnions 16 provided rigidly in connection with the hub 17 of an indicating arm 18. This arm normally extends vertically upwardly from the hub 17, and due to the balance of the beam 4, is maintained normally in the center of a graduated weight indicating surface 19 provided in the top of the tower 13, the deflections of the beam from neutral position causing the upper or outer end of the indicating arm to travel to one side or the other of the weight scale 19, to indicate the departure of the scale beam from its desired normal or neutral position. As previously stated, and if desired, a rigidly held torsion strip may be employed for mounting the indicator arm 18 in lieu of the knife edge trunnion disclosed at 16.

To avoid the necessity of using a strap connection between the beam and the hub 17 of the indicating arm, as has been employed in the past, the present invention comprehends the provision of an improved connection of a more durable and sensitive character between the beam and the indicator. This improved connection in the present instance has been shown as comprising a bracket 20, rigidly secured at its lower end to the beam 4 at a point spaced from the axis 3 of the beam, the said bracket being therefore mounted for oscillation in connection with the beam and is preferably disposed within the tower 13. The upper end of the bracket is provided with a resilient strip of metal of high grade steel, which strip is indicated generally by the numeral 21. The lower end of the strip is secured as at 22 to the upper end of the bracket 20, while the upper end of said strip has been vertically recessed to provide a multiplicity of spaced resilient fingers 23. In this instance the outer of the fingers 23 are provided with inwardly turned V shaped recesses 24, while the central finger is formed to include an upwardly directed recess portion 25.

A similar strip 26, which may be termed a crank extension, is provided in connection with the hub 17 of the indicator. The strip 26 has the lower portion thereof secured as at 27 to the hub of said indicator and arises vertically therefrom being offset horizontally as indicated at 28, and then provided with a plurality of spaced upwardly and vertically disposed fingers 29, corresponding in form and construction to the fingers 23 of the strip 21. In combination with this formation the strips 21 and 26 are connected by a substantially horizontally disposed metallic bar 30, having the outer ends thereof provided with laterally enlarged heads 31 and with longitudinally extending recesses 32 in the central portion thereof. The heads 31 are shaped to produce knife edges 33, which are receivable within the recesses 24 provided in the fingers 23 of the strips 21 and 26. Also, the recesses 32 have their inner ends provided with knife edge portions 34, which have seated in engagement with the recess portions 25 of the central fingers of the strips 21 and 26.

By virtue of this construction it will be seen that when the bar 30 occupies its operative position between said resilient strips it is resiliently sustained in connection therewith without the necessity of direct mechanical connections such as pivoting studs or rivets. The bar may be said to float between said strips, but is yet carried thereby in such manner as to minimize the presence of friction in the motion transmitting connection thus afforded. The resiliency of the tongues on the ends of said strips serves to maintain the bar under tension, eliminating looseness or relative movement between parts except for the substantially frictionless movements provided between the knife edges 33 and 34 and their corresponding seats. It will be observed that the outer of the fingers or tongues 23 act to apply tension to the bar 30, while the central fingers or tongues apply compressive forces thereto. In this manner the bar is securely positioned to transmit motion between the beam and the indicator in an effective and accurate manner, but a connection is provided which does not deteriorate, crystallize or fracture under the jars and jolts imparted to the scale when the latter is used commercially. Moreover, the structure has the capacity of absorbing initial shock to a very great extent and to relieve the indicating mechanism of strain. For example, if a weight is sharply applied to one or the others of the receivers 5 the stresses set up are initially received in the flexible fingers 23, which absorb the shock to a very large extent before the motion is finally imparted to the indicator. It is in this respect particularly that the construction enables the scale to be employed for long periods of time without requiring repair or adjustment. While the operating connections between the beam and the indicator has been shown on but one side of the scale, it will be understood that said connections may be placed on the opposite side of the scale or, if desired, on both sides without departing from the principles above set forth. Also other changes of an analogous nature may be made without departing from the spirit and scope of the invention as the latter has been defined in the subjoined claims.

What is claimed is:

1. The combination with the movable beam of a scale, a movable indicator, spaced crank extensions carried by said beam and indicator and provided with resilient extremities, and a connecting member uniting said extremities.

2. The combination with the movable beam of a scale, an indicator movably supported independently of the beam, and resiliently flexible connecting means pivotally connected with the beam and indicator and attached thereto in such relation that the travel of the beam is multiplied by the indicator, said connecting means serving to absorb shock and vibration imparted to the beam before said shock and vibrations are allowed to reach the indicator.

3. The combination with the movable beam of a scale, of an indicator supported independently of said beam, spaced resilient fingers projecting laterally from said beam and indicator to one side of the pivotal axis thereof, and a bar connecting the outer resilient ends of said fingers.

4. In a scale, an evenly balanced pivotally mounted beam, a weight indicator movably mounted in the plane of the axis of turning movement of the beam but to one side of and spaced from said axis, spaced crank extensions of resilient material carried by said beam and indicator, and a connecting member between the outer resilient ends of said crank extension.

5. In a scale, a pivotally mounted evenly balanced beam, an indicator pivotally mounted in the plane of the axis of turning movement of said beam, but spaced from said axis, resilient crank extensions connected respectively with said beam and indicator arm, the crank extension carried by said beam being longer than the crank extension of said arm, and a connection between the outer resilient ends of said crank extensions.

6. In a scale, a pivotally mounted beam, a pivotally mounted indicator spaced from said beam, crank extensions extending from said beam and arm and terminating in spaced relationship from the pivotal axes thereof, and a connecting member uniting the outer resilient ends of said crank extensions, said member having the ends thereof engaged frictionlessly with said crank extensions.

7. In a scale, a pivotally mounted beam, a pivotally mounted indicator arm spaced from said beam, crank extensions projecting from the pivotal portions of said beam and arm, the crank extension carried by the beam being materially longer than the crank extension carried by said arm, and a connecting member having a resilient connection between the adjoining outer ends of said crank extension.

8. In a scale, a pivotally mounted beam, a pivotally mounted indicator, crank extensions connected with the axial portions of said beam and indicator, the crank extension of the beam being longer than the crank extension of the indicator, said crank extensions having the outer ends thereof provided with a plurality of resilient fingers formed to include recesses, and a connecting bar provided with knife edge trunnions at the ends thereof frictionally received between said fingers with said trunnions received within said recesses.

9. In a scale, a pivotally mounted beam, a pivotally mounted indicator, spaced crank extensions carried by said beam and indicator, at least one of said crank extensions being provided with a resilient extremity, and a connecting member uniting said extensions.

10. In a scale, a pivotally mounted beam, a pivotally mounted indicator, spaced connecting elements disposed to one side of the pivotal axis of said beam and indicator at least one of said elements being resilient, and a member uniting said elements.

In testimony whereof I affix my signature.

WALTER S. SMITH.